(12) United States Patent
Handa et al.

(10) Patent No.: US 8,847,974 B2
(45) Date of Patent: Sep. 30, 2014

(54) DISPLAY PROCESSING APPARATUS

(75) Inventors: Tetsuya Handa, Fussa (JP); Takehiro Aibara, Hamura (JP); Hitoshi Amagai, Fussa (JP); Naotaka Uehara, Higashimurayama (JP); Takayuki Kogane, Akishima (JP); Sumito Shinohara, Akiruno (JP); Masato Nunokawa, Fussa (JP); Kimiyasu Mizuno, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 250 days.

(21) Appl. No.: 13/012,050

(22) Filed: Jan. 24, 2011

(65) Prior Publication Data
US 2011/0193876 A1    Aug. 11, 2011

(30) Foreign Application Priority Data

Feb. 8, 2010    (JP) .................................. 2010-025123

(51) Int. Cl.
*G09G 5/00*    (2006.01)
*G06T 11/00*    (2006.01)

(52) U.S. Cl.
CPC .................................... *G06T 11/001* (2013.01)
USPC ............................ 345/595; 345/619; 348/118

(58) Field of Classification Search
CPC combination set(s) only.
See application file for complete search history.

(56) References Cited

U.S. PATENT DOCUMENTS

| | | | |
|---|---|---|---|
| 6,720,971 B1 * | 4/2004 | Yamamoto et al. ........... | 345/581 |
| 7,233,684 B2 | 6/2007 | Fedorovskaya et al. | |
| 7,418,116 B2 | 8/2008 | Fedorovskaya et al. | |
| 7,860,386 B2 | 12/2010 | Terashima | |
| 2002/0002515 A1 | 1/2002 | Okazaki et al. | |
| 2006/0082579 A1 * | 4/2006 | Yao ............................... | 345/473 |
| 2007/0003113 A1 * | 1/2007 | Goldberg ...................... | 382/118 |
| 2008/0181507 A1 * | 7/2008 | Gope et al. ................... | 382/190 |
| 2008/0267443 A1 * | 10/2008 | Aarabi .......................... | 382/100 |

(Continued)

FOREIGN PATENT DOCUMENTS

| | | |
|---|---|---|
| CN | 1333515 A | 1/2002 |
| CN | 1510903 A | 7/2004 |

(Continued)

OTHER PUBLICATIONS

Chinese Office Action dated May 20, 2013 (and English translation thereof) issued in counterpart Chinese Application No. 201110034126.7.

(Continued)

*Primary Examiner* — Ke Xiao
*Assistant Examiner* — Kim-Thanh T Tran
(74) *Attorney, Agent, or Firm* — Holtz Holtz Goodman & Chick PC

(57) ABSTRACT

There is provided a display processing apparatus that displays an image represented by image data. The apparatus includes a storage unit configured to store the image data, an obtaining unit configured to obtain surrounding image data representing an image of surroundings in which the display processing apparatus is located, a determination unit configured to determine a color given to a region not smaller than a specific threshold region in a surrounding image represented by the obtained surrounding image data or the type of person determined from a face region of a person included in the surrounding image, a conversion unit configured to convert an image represented by the image data into a specific painting style associated with the determined color or the determine type of person, and a display unit configured to display a converted image represented by the converted image data.

8 Claims, 10 Drawing Sheets

(56) References Cited

U.S. PATENT DOCUMENTS

| | | | |
|---|---|---|---|
| 2009/0154841 A1* | 6/2009 | Choi et al. | 382/307 |
| 2010/0027907 A1* | 2/2010 | Cherna et al. | 382/274 |
| 2010/0195912 A1* | 8/2010 | Nakada et al. | 382/190 |
| 2011/0116689 A1* | 5/2011 | Yen et al. | 382/118 |
| 2011/0164143 A1* | 7/2011 | Shintani et al. | 348/222.1 |

FOREIGN PATENT DOCUMENTS

| | | |
|---|---|---|
| CN | 101086598 A | 12/2007 |
| JP | 2005-151271 A | 6/2005 |
| JP | 2005-300639 A | 10/2005 |
| JP | 2007-085864 A | 4/2007 |
| JP | 2007-264124 A | 10/2007 |
| JP | 2007-280291 A | 10/2007 |
| JP | 2009-156948 A | 7/2009 |
| JP | 2009-218642 A | 9/2009 |

OTHER PUBLICATIONS

Japanese Office Action dated Nov. 29, 2011 (and English translation thereof) in counterpart Japanese Application No. 2010-025123.

* cited by examiner

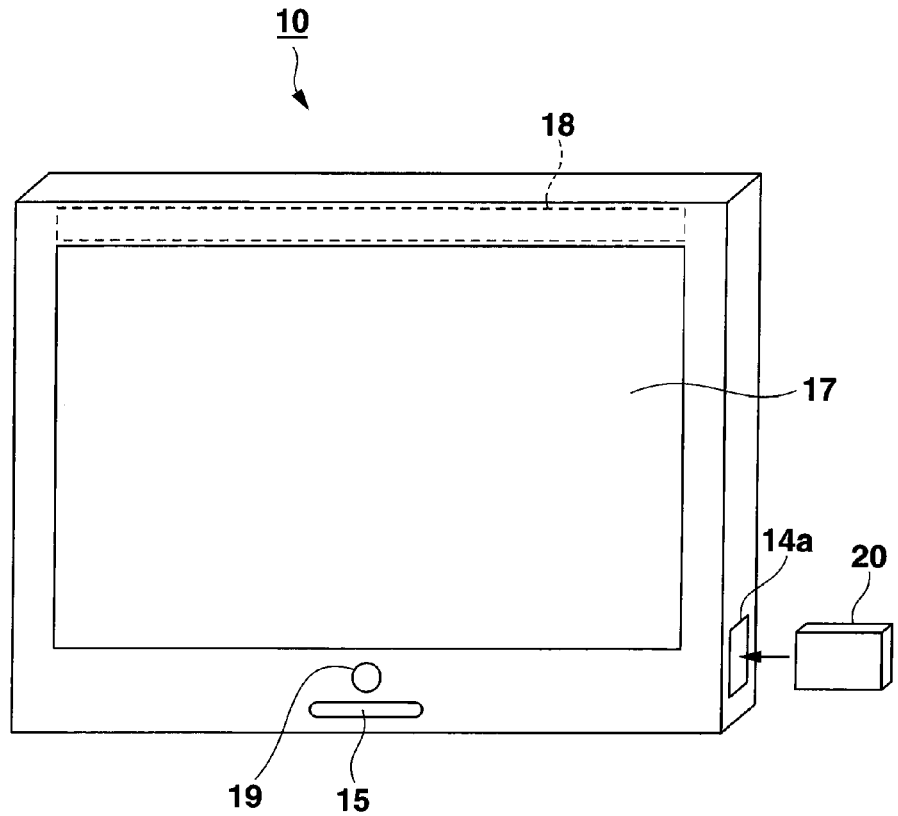
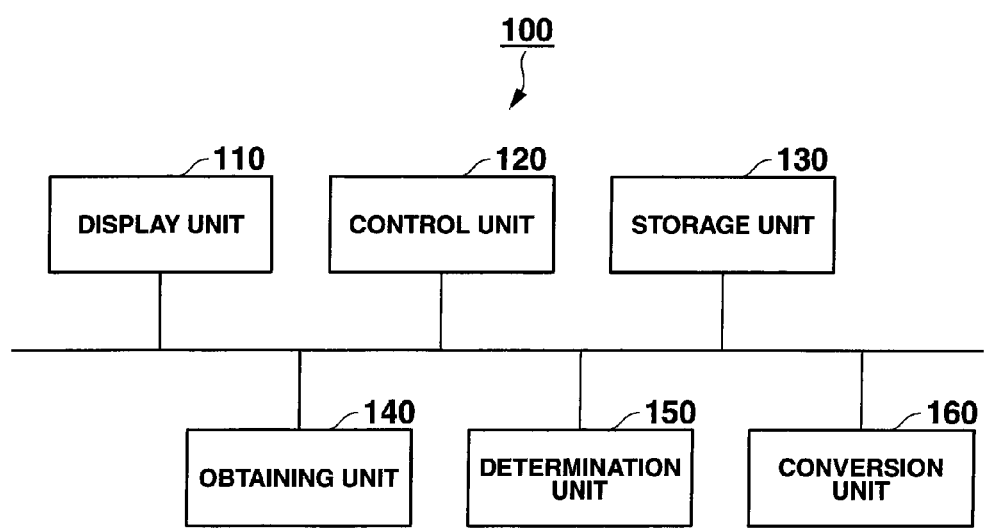

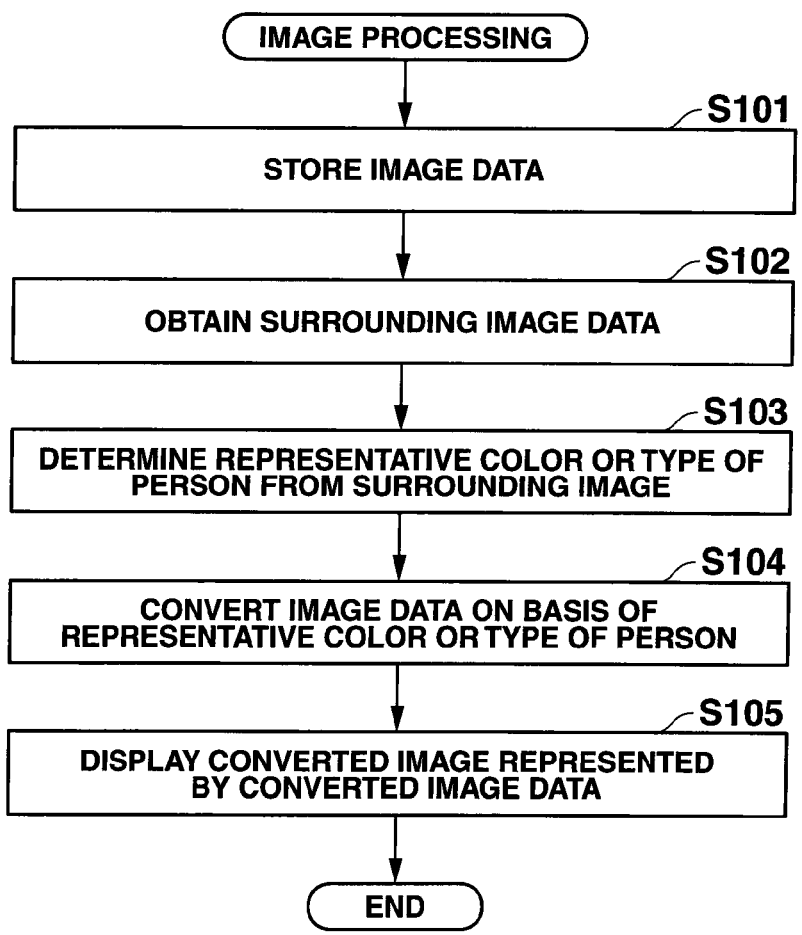

ONE PIXEL

| COLOR COMPONENT | PERCENTAGE |
|---|---|
| BLACK | 20 % |
| GRAY | 0 % |
| ⋮ | ⋮ |
| WHITE | 80 % |

← REPRESENTATIVE COLOR

FIG.10

| REPRESENTATIVE COLOR OR TYPE OF PERSON | PAINTING STYLE |
|---|---|
| WHITE | PASTEL DRAWING STYLE |
| GRAY | EMBOSSED STYLE |
| BLUE | WATERCOLOR PAINTING STYLE |
| BLACK | INK PAINTING STYLE |
| LITTLE CHILD | PENCIL DRAWING STYLE |
| JAPANESE | JAPANESE-STYLE PAINTING |
| WESTERNER | WESTERN-STYLE PAINTING |
| ⋮ | ⋮ |

DISPLAY PROCESSING APPARATUS

CROSS-REFERENCE TO RELATED APPLICATIONS

This application is based upon and claims the benefit of priority from prior Japanese Patent Application No. 2010-025123, filed Feb. 8, 2010, the entire contents of which are incorporated herein by reference.

BACKGROUND OF THE INVENTION

1. Field of the Invention

The present invention relates to a display processing apparatus suitable for displaying an image desired by the user.

2. Description of the Related Art

One known display processing apparatus obtains information (e.g., brightness) on the surrounding environment in which the display processing apparatus is located and displays an image according to the information on the surrounding environment (refer to, for example, Jpn. Pat. Appln. KOKAI Publication No. 2007-65864 [hereinafter, referred to as patent document 1]).

However, with the display processing apparatus described in patent document 1, a displayed image sometimes did not coincide with an image desired by the user. This occasionally made some users dissatisfied at not getting a desired image displayed. Therefore, new method suited to display an image desired by the user has been sought after.

BRIEF SUMMARY OF THE INVENTION

Accordingly, it is an object of the present invention to provide a display processing apparatus suited to display an image desired by the user.

According to one aspect of the present invention, there is provided a display processing apparatus that displays an image represented by image data. The apparatus includes a storage unit configured to store the image data, an obtaining unit configured to obtain surrounding image data representing an image of surroundings in which the display processing apparatus is located, a determination unit configured to determine a color given to a region not smaller than a specific threshold region in a surrounding image represented by the obtained surrounding image data or the type of person determined from a face region of a person included in the surrounding image, a conversion unit configured to convert an image represented by the image data into a specific painting style associated with the determined color or the determine type of person, and a display unit configured to display a converted image represented by the converted image data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a schematic external view of the digital photoframe;

FIG. 3 is a block diagram showing the function of each part of the display processing apparatus according to the embodiment;

FIG. 6 is a flowchart to explain the flow of image processing performed at the display processing apparatus;

FIG. 10 is a correspondence table of representative colors or types of person and painting styles.

DETAILED DESCRIPTION OF THE INVENTION

Hereinafter, a display processing apparatus according to an embodiment of the invention will be explained. Although the display processing apparatus will be explained, taking a digital photoframe capable of displaying a digital photo or the like as an example, the invention is not limited to this. For instance, the invention may be applied to a display processing apparatus for a digital camera, various types of computer, a personal digital assistant (FDA), or a mobile phone. That is, the embodiment described below is illustrative and does not restrict the scope of the invention. Therefore, those skilled in the art may employ embodiments obtained by replacing one or all of the elements with its or their equivalents. Those embodiments are also included in the scope of the invention.

Figure 1:
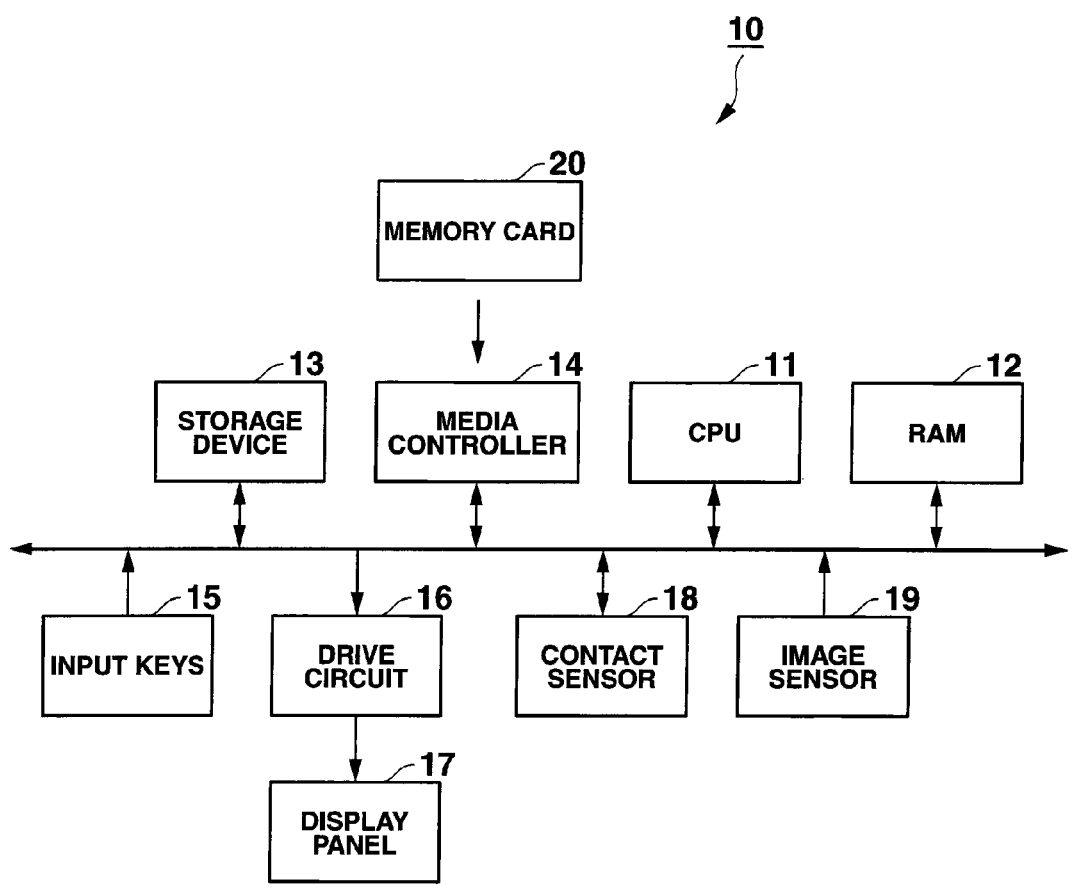
FIG. 1 is a block diagram showing a hardware configuration of a digital photoframe which realizes a display processing apparatus according to an embodiment of the invention.

FIG. 1 is a block diagram showing a hardware configuration of a typical digital photoframe 10 which realizes a display processing apparatus according to the embodiment. FIG. 2 is an external view of the digital photoframe 10. Hereinafter, an explanation will be given with reference to these figures.

The digital photoframe 10 includes a central processing unit (CPU) 11, a random access memory (RAM) 12, a storage device 13, a media controller 14, input keys 15, a drive circuit 16, a display panel 17, a contact sensor 18, an image sensor 19, and a memory card 30.

The CPU 11, which controls the operation of the entire digital photoframe 10, is connected to the individual components and exchanges control signals and data with them.

The RAM 12 is for storing data and programs temporarily. The RAM 12 holds programs, data, and necessary data for the operation of the digital photoframe 10.

The storage device 13, which is composed of, for example, a hard disk or a flash memory, stores arbitrary data, such as image data read from the memory card 20. The memory card 20, which is composed of, for example, a flash memory, stores various items of data. In the memory card 20, image data, such as digital photos shot with a digital camera, is stored.

The media controller 14 is for reading or writing data from or into the memory card.

In the side of the digital photoframe 10, for example, a memory card insertion opening 14a into which the memory card 20 is to be inserted is made as shown in FIG. 2. The memory card 20 is inserted into the memory card insertion opening 14a, thereby connecting the memory card 20 with the media controller 14. When the connection between the memory card 20 and media controller 14 has been confirmed, image data recorded in the memory card 20 is read.

The input keys 15 are keys for accepting an operation instruction from the user. The input keys 15 are composed of, for example, a selection key used for the user to select a desired photo, a play/stop key used to start and stop a so-called slide show. As shown in FIG. 2, the input keys 15, which are in the lower part of the frame of the display panel 17 of the digital photoframe 10, output an on signal or the like corresponding to the user's pressing operation as operation information.

The drive circuit 16 drives the display panel 17 according to image data stored in the storage device 13 or memory card 20, thereby displaying an image, an operation screen, or the like on the display panel 17.

The display panel 17, which is composed of, for example, a liquid-crystal penal, an organic electroluminescent (organic EL) panel, displays an arbitrary image on the basis of the operation of the drive circuit 16. As shown in FIG. 2, the display panel 17 is arranged, for example, at the front of the digital photoframe 10.

The contact sensor 18 is a sensor which senses an object that contacts the sensor, such as the user's finger. The contact sensor 18 is composed of, for example, a touch sensor of the capacitance type or pressure-sensitive type. As shown in FIG. 2, the contact sensor 18 is provided, for example, at the frame of the display panel 17 of the digital photoframe 10. When the user contacts the contact sensor 18 with the user's finger or the like, the sensor 13 outputs operation information indicating that the finger or the like has contacted the sensor, pressing force information indicating the pressing force applied to the sensor, and the like.

The image sensor 19 is a sensor which senses formation on the surrounding environment of the digital photoframe 10. The image sensor 19 is composed of a camera of, for example, the charged-coupled device (CCD) type or complementary metal-oxide semiconductor (CMOS) type. As shown in FIG. 2, the image sensor 19 is provided at, for example, the frame of the display panel 17 of the digital photoframe 10. The image sensor 19 typically shoots a photograph of the surroundings of the digital photoframe 10 with arbitrary timing an arbitrary number of times. The image sensor 19 can shoot moving images as well. The shot images are stored in the storage device 13 or memory card 20. From the images, the surrounding environment information is extracted.

Hereinafter, if not otherwise specified, the display processing apparatus described layer will be explained with reference to the digital photoframe 10 shown in FIGS. 1 and 2. The display processing apparatus may be substituted for an element of an ordinary compute, a digital camera, or the like. These embodiments are also included in the scope of the invention.

(Configuration of Display Processing Apparatus)

A schematic configuration of the display processing apparatus 100 of the embodiment will be explained with reference to FIG. 3. The display processing apparatus 100 includes a display unit 110, a control unit 120, a storage unit 130, an obtaining unit 140, a determination unit, and a conversion unit 160. Hereinafter, the individual components of the display processing apparatus 100 will be explained.

Although the functions of the individual units are related to one another, whether or not each of the units is used may be changed depending on the use.

The display unit 110 displays an image represented by image data under the control of the control unit 120. For example, the display unit 110 can display images represented by image data stored in the storage unit 130 one after another at specific time intervals or divide the screen into many sub-screens and display an image on each of the subscreens simultaneously. The display unit 110 can display an arbitrary image by an arbitrary method.

The CPU 11, drive circuit 16, display panel 17, and others cooperate with one another in operation so as to function as the display unit 110.

The control unit 120, which controls the operation of the entire display processing apparatus 100, is connected to the individual components and exchanges signals and data with them.

The CPU 11, RAM 12, and others cooperate with one another in operation so as to function as the control unit 120.

The storage unit 130 stores image data to be displayed on the display unit 110. The storage unit 130 stores image data corrected and adjusted by the conversion unit 160 as needed. The storage unit 130 further stores arbitrary data, including a correspondence table where representative colors or types of person described later are associated with painting styles, setting data set by the user, and a control program for controlling the display processing apparatus 100.

The RAM 12, storage device 13, memory card 20, and others cooperate with one another in operation so as to function as the storage unit 130.

The obtaining unit 140 obtains surrounding image data representing a surrounding image showing the surroundings of the display processing apparatus 100. The surroundings of the display processing apparatus 100 mean an arbitrary range that can be shot by the obtaining unit 140. The surrounding image is typically an image showing the surroundings in which the display processing apparatus 100 is located. For example, the surrounding image is an arbitrary image shot by the obtaining unit 140, such as an image showing a whole room, or an image showing articles in a room (i.e., furniture, windows, stationary articles, or the like).

Figure 4:
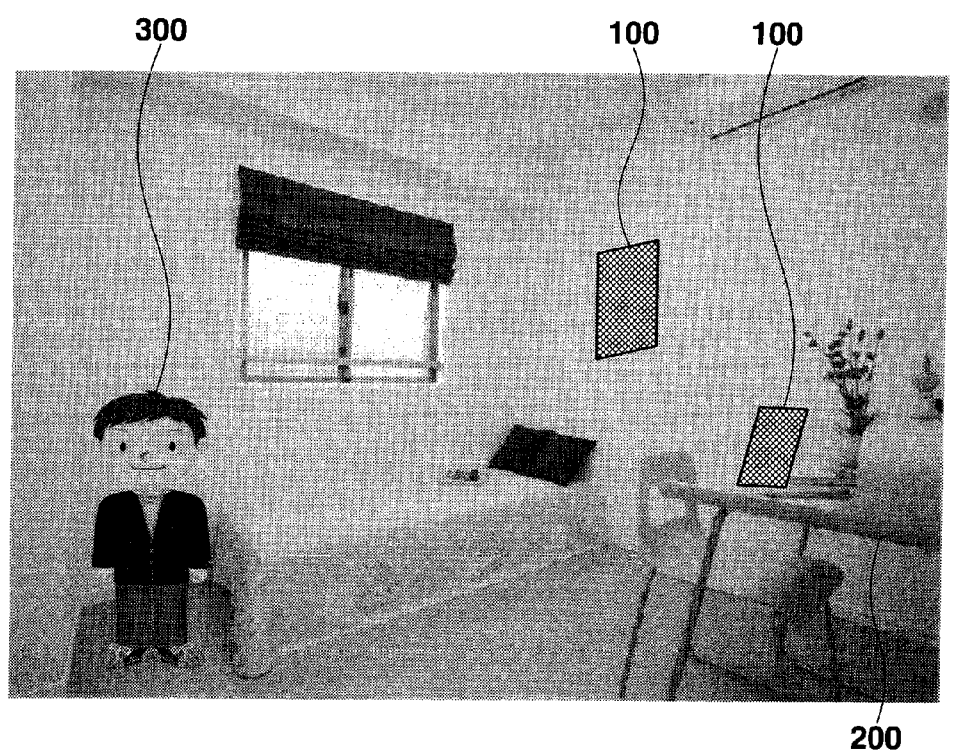
FIG. 4 shows an example of the location of the display processing apparatus.

FIG. 4 shows an example of the location of the display processing apparatus 100. As shown in FIG. 4, the display processing apparatus 100 is typically located on the wall of a room, on the table, or the like. Therefore, the obtaining unit 140 shoots an image showing the whole room, an image showing a specific range of the room, an image showing a person in the room, or the like, thereby obtaining surrounding image data representing the surroundings of the display processing apparatus 100.

Figure 5A:
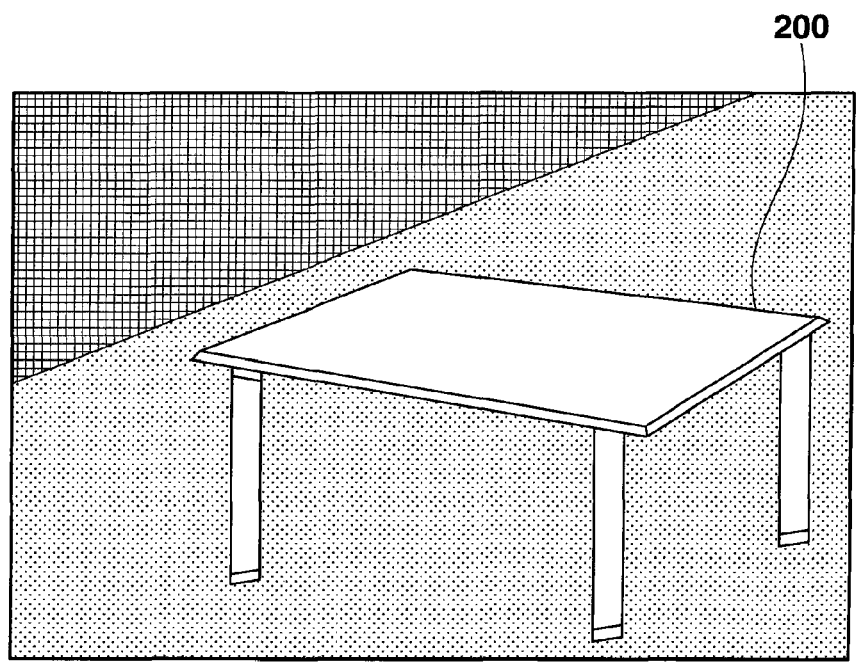
FIG. 5A shows an example of a surrounding image.
Figure 5B:
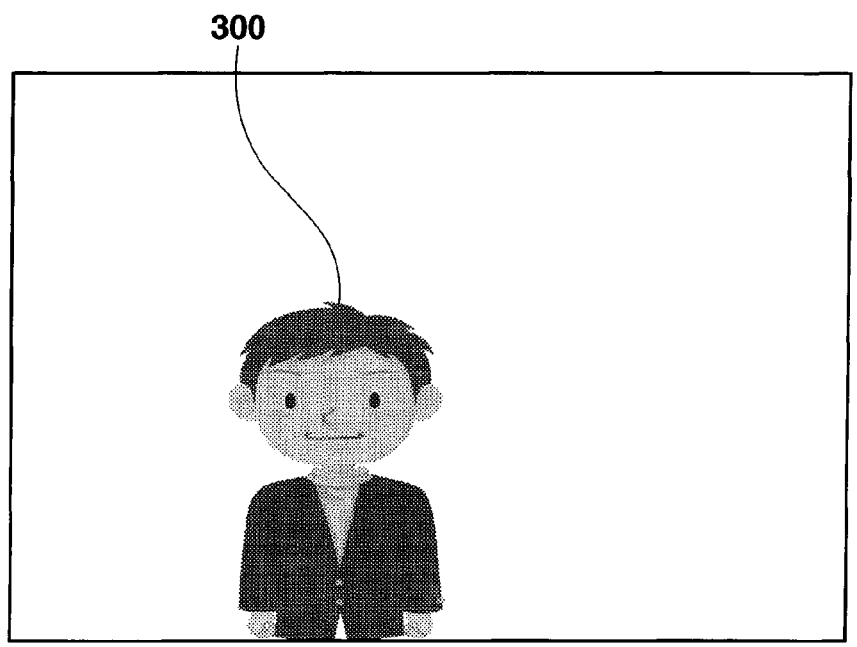
FIG. 5B shows another example of a surrounding image.

Each of FIGS. 5A and 5B shows a surrounding image. For example, suppose the display processing apparatus 100 is located on the wall as shown in FIG. 4. In this case, as shown in FIG. 5A, the obtaining unit 140 obtains surrounding image data representing a surrounding image obtained by shooting a table 200 in a room where the display processing apparatus 100 is located. When there is a person in a room where the display processing apparatus 100 is located, the obtaining unit 140 obtains surrounding image data representing a surrounding image obtained by shooting a person 300 as shown in FIG. 5B.

The obtaining unit 140 can obtain surrounding image data with arbitrary timing, for example, when the user has given an instruction, when a specific time has been reached, when the surrounding environment has changed, or the like. The obtaining unit 140 further can obtain surrounding image data with arbitrary setting (e.g., shooting direction, magnification, shutter speed, diaphragm, or the like).

Having accepted an instruction input from the user, the obtaining unit 140 obtains instruction input information. For example, the obtaining unit 140 accepts an instruction input from the user via the input key 15 or contact sensor 18. Then, on the basis of the accepted instruction input, the display processing apparatus 100 operates.

The CPU 11, input key 15, contact sensor 18, image sensor 19, and others cooperate with one another in operation so as to function as the obtaining unit 140.

The determination unit 150 obtains pixel information from the surrounding image data obtained by the obtaining unit 140 and sorts out colors on the basis of the pixel information, thereby determining a representative color from the surrounding image. Here, the representative color typically means a color that occupies a region not smaller than a specific threshold region, a color that has the highest proportion among a plurality of colors, or the like. For example, the determination unit 150 determines the hue, chronic, brightness, and the like for each of the pixels in surrounding image data, thereby determining the color components of the pixel. Then, the determination unit 150 determines a representative color on the basis of the proportion of each of the determined color components in the surrounding image.

when a person appears in the surrounding image obtained by the obtaining unit 140, the determination unit 150 determines the type of person. The type of person typically means gender, age, age bracket, race, and the like, that is, arbitrary features that identify the person. The determination unit 150 detects, for example, the face area of the person appearing in the surrounding image and determines the type of person on the basis of the likelihood of feature points of the face area. The feature points mean, for example, eye color, hair color, skin color, facial contour, and the like, that is, arbitrary points and regions of the face area. A known method may be used as the method of determining the type of person. The method of determining the type of person has made allowance for Jpn. Pat. Appln. KOKAI Publication No. 2007-280291.

To sense the face area of the person appearing in the surrounding image, the determination unit 150 searches for the face area of the person, an attention area in the surrounding image represented by the surrounding image data on the basis of the surrounding image data obtained by the obtaining unit 140. The attention area means an area where a main subject (a person) appears, typically a face area where the face of the person shows up. The determination unit 150 uses, for example, a prepared template image including an image of a specific face (main subject) to search for an area whose similarity to the template image is not less than a specific reference by template matching or the like. Such an area is the attention area. It the area exists, the determination unit 150 senses the area as an attention area. Known techniques (e.g., the technique for sensing a face) may be used to search for and sense such an attention area.

When there are a plurality of candidates for an attention area, the determination unit 150 may set, for example, one randomly selected from the candidates as an attention area. In addition, when having sensed no attention area on the basis of one surrounding image data item, the determination unit 150 may sense an attention area on the basis of the next surrounding image data item obtained by the obtaining unit 140.

The CPU 11, RAM 12, and others cooperate with one another in operation so as to function as the determination unit 150.

The conversion unit 160 converts data stored in the storage unit 130 or image data obtained by the obtaining unit 110 into image data in a specific format. For example, the conversion unit 160 converts the style of a photographic image into the style of pastel drawing, ink painting, watercolor painting, pencil drawing, Japanese-style painting, Western-style painting, or the like. The conversion unit 160 can arbitrarily correct or adjust image data and an image represented by the image data.

Here, an artistic effect is an effect that produces a special, visual characteristic.

Pastel drawing typically includes an image drawn in pastels and further includes an image represented by bright colors and tenderness which are characteristic of the pastels.

Ink painting typically includes an image drawn in India ink and further includes an image represented by shading and tone produced by black-ink lines or gradations of ink.

Watercolor painting typically includes an image drawn in watercolors and further includes an image represented by gradation, lightness, warmth, and the like.

Pencil drawing typically includes an image drawn in pencil and further includes an image represented by the shading of colors that is characteristic of pencils.

Japanese-style painting typically includes an image with Japanese characteristics in the subject and the painting style and further includes an image where Japanese scenes have been drawn and an image drawn by a Japanese person.

Western-style painting typically includes an image with Western characteristics in the subject and the pa style and further includes an image where Western scenes have been drawn and an image drawn by a Westerner.

The painting style is a visual impression of an image. It further includes the characteristic or tendency of a painter or a school that appears in a picture or the characteristic or tendency of the way of expressing a painting.

The painting style is converted by subjecting an image represented by image data to image processing to change the painting style. Such image processing is performed by image processing that produces the same effect as a filter (art filter) used in a graphic software program dealing with cluster image data (a so-called paint program [e.g., Photoshop (registered trademark)]). In the image processing, various parameters for the image represented by the original image data are changed, thereby generating a converted image, such as a pastel image. In this case, the type of image processing is arbitrary. Various types of image conversion that can be realized by appropriate image processing (e.g., conversion to monochromatic appearance, conversion to sepia appearance, conversion to soft focus appearance, conversion to vivid appearance, conversion to mosaic appearance, and conversion to miniature photo style) may be applied.

The aforementioned parameters are various values used in performing image processing. Such parameters are values indicating the property of an image. For example, the parameters are composed of various values depending on the type of image processing (the painting style to be changed), including the values of brightness, conversion accuracy, smoothness, and texture. In this case, the parameters represent the degree of modification of the painting style. The degree of modification is a value used as a yardstick in determining to what degree the image conversion process is carried out, a variation between an unprocessed image and the processed image when the two images are compared.

The CPU 11, RAM 12, and others cooperate with one another in operation so as to function as the conversion unit 160.

Next, image processing performed by the display processing apparatus 100 of the embodiment will be explained. FIG. 6 is a flowchart to explain the flow of image processing. Hereinafter, the image processing will be explained with reference to FIG. 6.

First, the storage unit 130 stores image data to be displayed on the display unit 110 (step S101). For example, image data obtained by a digital camera or a camera-equipped mobile phone is obtained via a memory card or infrared communication and stored in the storage unit 130.

Next, the obtaining unit 140 shoots the surroundings of the display processing apparatus 100, thereby obtaining surrounding image data (step S102). For example, when the user has given an instruction, when a specific time has been reached, when the surrounding environment has changed, or when a person near the display processing apparatus 100 has moved, the obtaining unit 140 shoots the surroundings of the display processing apparatus 100 to obtain surrounding image data. The obtained surrounding image data is stored in the storage unit 130.

Each of FIGS. 5A and 5B shows an example of a surrounding image. The obtaining unit 140 shoots, for example, an image including a table 200 in a room as shown in FIG. 5A, thereby obtaining surrounding image data. In addition, when there is a person near the display processing apparatus 100 as shown in FIG. 5B, the obtaining unit 140 shoots an image including the person, thereby obtaining surrounding image data.

Next, the determination unit 150 obtains pixel information from the surrounding image data stored in the storage unit 130 and sorts out colors on the basis of the pixel information, thereby determining a representative color from the surrounding image (step S103). The determination unit 150 determines, for example, hue, chroma, brightness, and others for each of the pixels in the surrounding image data, thereby determining the color components of the pixel. Then, the determination unit 150 determines a representative color on the basis of the proportion of each of the determined color components in the surrounding image.

Figures 7, 8:
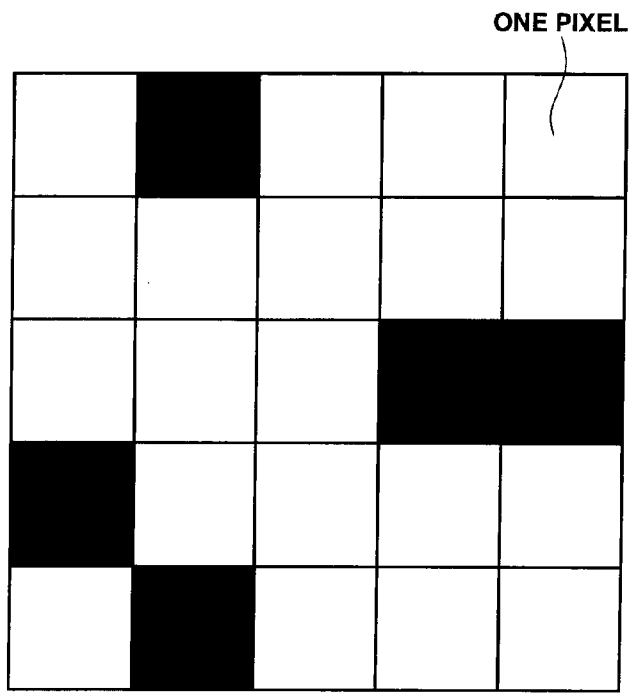
FIG. 7 is an expedient diagram to facilitate understanding to explain a method of determining a representative color.
FIG. 8 is a table showing an example of the classification of color components included in a surrounding image.

FIG. 7 is an expedient diagram to facilitate understanding to explain a method of determining a representative color. If a square shown in FIG. 7 is a pixel, a whole image is composed of 25 pixels. Of the pixels, the number of black pixels is 5 and the number of white pixels is 20. Therefore, the proportion of each of the color components is as follows: the black pixels are 5/25=20% of the total of 25 pixels and the white pixels are 20/25=80%. Accordingly, when the color component which has the largest percentage is set as a representative color, white is determined to be a representative color.

FIG. 8 is a table showing an example of the classification of color components included in a surrounding image. As shown in FIG. 8, the percentage of each color component is calculated and a representative color is determined en the basis of the percentage. In FIG. 8, since the percentage of white is the greatest, white is determined as a representative color.

In addition, for example, in the case of a surrounding image in which a table 200 as shown in FIG. 5A is included, the determination unit 150 determines white whose percentage is the greatest to a representative color.

Furthermore, the determination unit 150 may determine a representative color by an arbitrary method. For example, the determination unit 150 may divide a surrounding image into a plurality of pieces (e.g., 100 pieces), not into pixels, and determine color components for each of the divided images, thereby determining a representative color. Moreover, the determination unit 150 may determine a representative color from a plurality of surrounding image data items. This makes it possible to determine the best color representing the surroundings.

The number of representative colors is not limited to one and may be two or more. The number of classifications is arbitrary, such as 16 or 256.

When a person appears in a surrounding image obtained by the obtaining unit 140, the determination unit 150 determines the type of person (step S103). For example, the determination unit 150 senses a face area of the person appearing in the surrounding image and determines the type of person on the basis of the likelihood of the feature points in the face area Then, the image is converted on the basis of the determined type of person. For example, when the surrounding image includes a person 300 as shown in FIG. 55, the determination unit 150 senses the face area of the person 300 and determines the type of person 300 to be a little child on the basis of the likelihood of the feature points of the face area.

In addition, the determination unit 150 may determine a representative color or the type of person on the basis of surrounding image data obtained and stored at specific time intervals. For example, when there are ten surrounding image data items obtained at specific time intervals, the determination unit 150 determines a representative color or the type of person from the ten surrounding image data items. Since the surroundings of the display processing apparatus 100 change over time, the obtained surrounding image also changes. When a representative color and the type of person are determined on the basis of the surrounding image data items obtained at specific time intervals, a converted image converted on the basis of the representative color or the type of person changes with time. Therefore, since the converted image can be changed as time advances, an image desired by the user can be displayed as needed.

The determination unit 150 may extract all or a part of the surrounding image data items and determine a color or the type of person on the basis of the extracted data items.

Next, the conversion unit 160 converts the image data stored in the storage unit 130 on the basis of the determined representative color or the determined type of person (step S104). The conversion unit 160 converts the image data so that the color of the surroundings of the display processing apparatus 100 may coincide with the color of an image displayed by the display processing apparatus 100. Here, the color of the surroundings means the color occupying the surroundings of the display processing apparatus 100 and typically corresponds to the representative color determined from the surrounding image data.

Figure 9A:
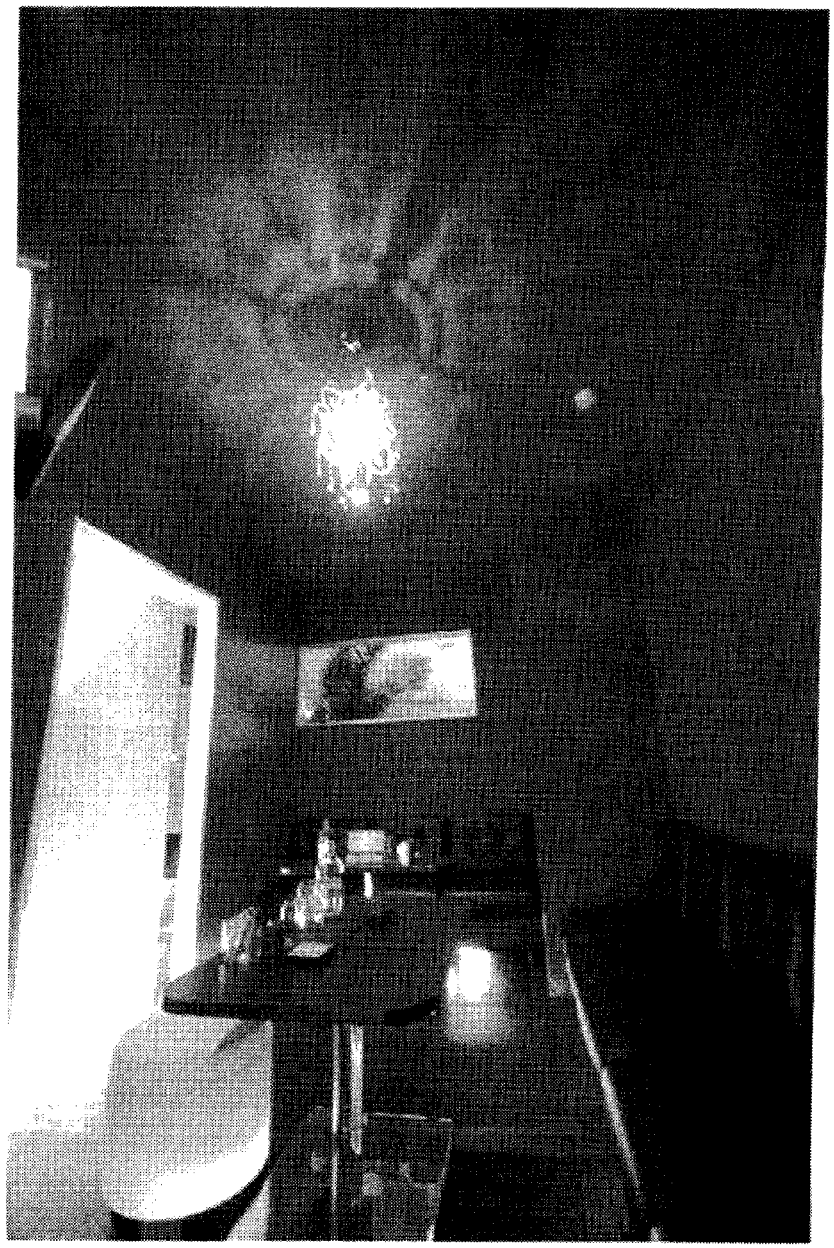
FIG. 9A shows an example of an image before conversion.
Figure 9B:
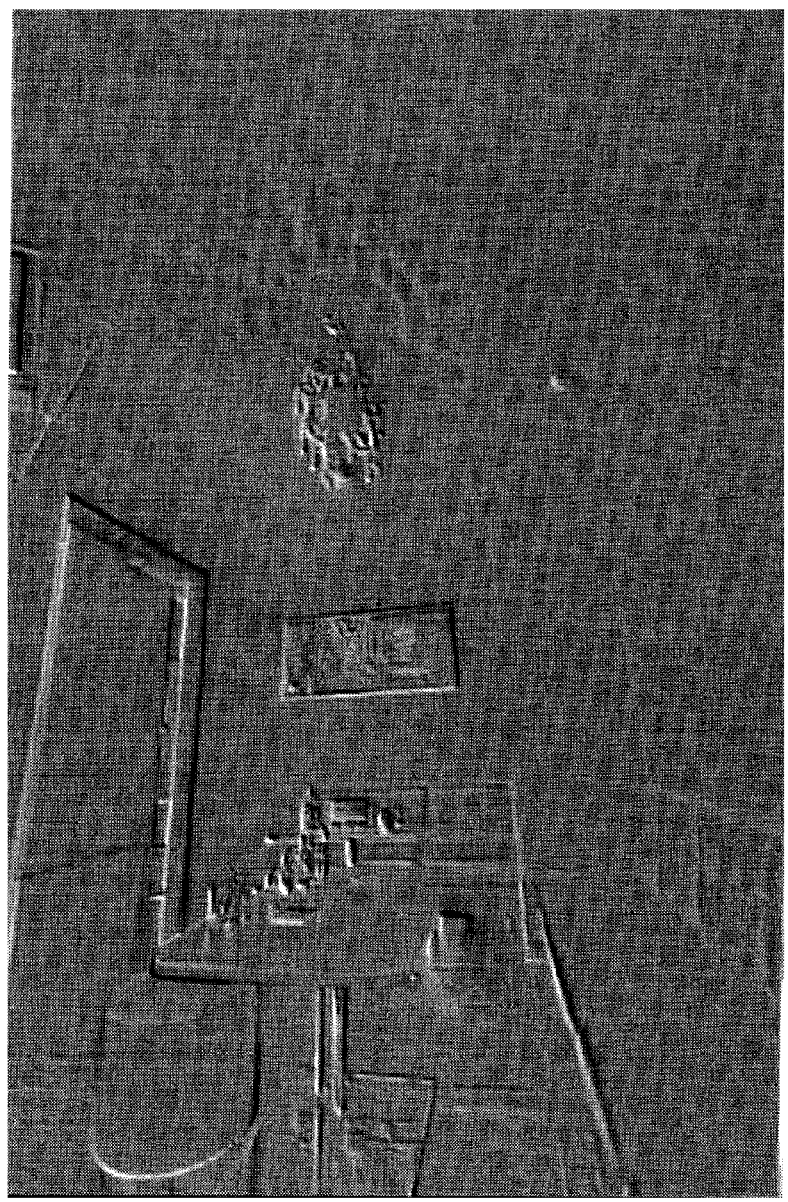
FIG. 9B is an example of an image after conversion.
Figure 9C:
FIG. 9C is another example of an image after conversion.

FIG. 9A shows an image before conversion. FIGS. 9B and 9C show images after conversion. Here, an image before conversion is typically an image shot with a digital camera or a camera-equipped mobile phone. For example, when a representative color is gray, the conversion unit 160 converts a general image shot with a digital camera or the like into an embossed-style image in gray as shown in FIGS. 9A and 9B. The embossed style is a representation of raised characters or pictures or a three-dimensional representation.

When a representative color is determined, what conversion is to be performed is arbitrary. The user can set the type of conversion arbitrarily. When a representative color is white, the conversion unit 160 may convert an image into a pastel painting style featuring subtle colors. When a representative color is blue, the conversion unit 160 may convert an image into a watercolor painting style. When a representative color is black, the conversion unit 160 may convert an image into an ink painting style. By doing this, an image whose painting style coincides with the surrounding color can be displayed. When the surrounding color is blue, that is, when the representative color is blue, an image matching with the surrounding color can be displayed by converting the image to be displayed into a watercolor painting style.

In addition, the conversion unit 160 can convert image data so that a color the same as or similar to the determined representative color may be allocated to a region not smaller than a specific threshold region. Here, similar colors are such that the hue difference between colors is small. Colors whose color property is similar are also included in similar colors. With the conversion, an image matching with the surrounding color can be displayed.

When there is no representative color because the percentage of each of the color components is less than a specific value, the conversion unit 160 can convert image data randomly.

Furthermore, when a person appears in the surrounding image shot by the obtaining unit 140, the conversion unit 160 may convert the image so that the image may correspond to the person. For example, when a little child appears in the surrounding image, the conversion unit 160 converts an ordinary image shot with a digital camera or the like into an image of the pencil-drawing style. Since the little child is apt to like drawing a picture with colored pencils, when a little child appears in the surrounding image, it is possible to please the child by showing an image of the pencil-drawing style.

When the type of person is determined, what conversion is to be performed is arbitrary. The user can set the type of conversion arbitrarily. For example, when the type of person is Japanese, the conversion unit 160 can convert an image into to a Japanese-style painting. When the type of person is a Westerner, the conversion unit 160 can convert an image into to a Western-style painting. With this conversion, an image a specific person typically likes can be displayed.

FIG. 10 is a correspondence table of representative cc ors or types of person and painting styles. As shown in FIG. 10, the conversion unit 160 converts the painting style of an image to be displayed so as to cause the imago to correspond to the determined color or the determined type of person.

In a case where the user and the painting style desired by the user are stored such that the user and the style correspond to each other, when the user appears in the surrounding image obtained by the obtaining unit 140, the conversion unit 160 may convert the image into the painting style desired by the user. With this conversion, an image desired by the user can be displayed.

Next, the display unit 110 displays a converted image represented by the converted image data (step S105). The display unit 110 displays, for example, a converted image as shown in FIG. 9B. The display unit 110 may display converted images one after another as in a slide show or continue displaying the same converted image.

By the above processes, an image suited for the surrounding environment can be displayed such that the painting style of the image displayed by the display processing apparatus 100 is caused to correspond to the color of the surroundings in which the display processing apparatus 100 is located. In addition, an image desired by the user can be displayed.

The invention is not limited to the above embodiment and may be practiced or embodied in still other ways.

The aforementioned hardware configurations and flowcharts are illustrative and may be changed and modified arbitrarily.

The main part that performs the processing of the display processing apparatus 100 composed of the display unit 110, control unit 120, storage unit 130, obtaining unit 140, determination unit 150, and conversion unit 160 can be realized by an ordinary computer system instead of a digital photoframe. For example, the display processing apparatus 100 that carries out the aforementioned processing may be configured by storing a computer program for performing the above operations on computer-readable recording media (e.g., floppy disks, CD-ROMs, or DVD-ROMs), distributing the media, and installing the computer program in a computer. The display processing apparatus 100 may be configured by storing the computer program on a storage device of a server unit on a communication network, such as the Internet, and downloading the program into an ordinary computer system.

When the function of the display processing apparatus 100 is shared by an operating system (OS) and an application program or realized by the cooperation between the OS and the application program, only the application program part may be stored in a recording medium or a storage device.

Furthermore, a computer program may be superimposed on a carrier wave and then distributed. For example, the computer program may be uploaded to a bulletin board system (BBS) on a communication network and then distributed via the network. The aforementioned processing may be configured to be performed by activating the computer program and running the program in the same manner as other application programs under the control of the OS.

As described above, according to the embodiment of the invention, it is possible to provide a display processing apparatus suited to display an image desired by the user.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A display processing apparatus comprising:
an obtaining unit configured to obtain person image data including a person viewing the display processing apparatus;
a determination unit configured to determine a characteristic of the person included in the obtained person image data, from a face region of the person;
a storage unit configured to store image data that does not include a person viewing the display processing apparatus;
a conversion unit configured to convert an image represented by the image data that is stored in the storage unit and does not include a person viewing the display processing apparatus into a specific painting style associated with the determined characteristic of the person, wherein a converted image resulting from the conversion does not include the person in the obtained person image data; and
a display unit configured to display the converted image.

2. The display processing apparatus according to claim 1, wherein:
the obtaining unit obtains the person image data including a person viewing the display processing apparatus at specific time intervals, and
the determination unit determines the characteristic of the person from the person image data obtained at the specific time intervals.

3. A non-transitory computer-readable storage medium storing a program that is executable by a display processing apparatus to perform display processing comprising:
obtaining person image data including a person viewing the display processing apparatus;
determining a characteristic of the person included in the obtained person image data, from a face region of the person;
storing image data that does not include a person viewing the display processing apparatus;

converting an image represented by the stored image data that does not include a person viewing the display processing apparatus into a specific painting style associated with the characteristic of the person, wherein a converted image resulting from the conversion does not include the person in the obtained person image data; and displaying the converted image.

4. The display processing apparatus according to claim 1, wherein the conversion unit (i) converts the image into a pencil-drawing style when the determined characteristic of the person indicates that the person is a child, (ii) converts the image into a Japanese-style painting when the determined characteristic of the person indicates that the person is Japanese, and (iii) converts the image into a Western-style painting when the determined characteristic of the person indicates that the person is a Westerner.

5. The non-transitory computer-readable storage medium according to claim 3, wherein:

the person image data including a person viewing the display processing apparatus is obtained at specific time intervals, and the characteristic of the person is determined from the person image data obtained at the specific time intervals.

6. The non-transitory computer-readable storage medium according to claim 3, wherein the converting comprises (i) converting the image into a pencil-drawing style when the determined characteristic of the person indicates that the person is a child, (ii) converting the image into a Japanese-style painting when the determined characteristic of the person indicates that the person is Japanese, and (iii) converting the image into a Western-style painting when the determined characteristic of the person indicates that the person is a Westerner.

7. This display processing apparatus according to claim 1, wherein the conversion unit converts the image into a pencil-drawing style when the determined characteristic of the person indicates that the person is a child.

8. The non-transitory computer-readable storage medium according to claim 3, wherein the converting comprises converting the image into a pencil-drawing style when the determined characteristic of the person indicates that the person is a child.

* * * * *

UNITED STATES PATENT AND TRADEMARK OFFICE
CERTIFICATE OF CORRECTION

PATENT NO. : 8,847,974 B2
APPLICATION NO. : 13/012050
DATED : September 30, 2014
INVENTOR(S) : Tetsuya Handa et al.

Page 1 of 1

It is certified that error appears in the above-identified patent and that said Letters Patent is hereby corrected as shown below:

In the Claims

Column 12, line 13, claim 7, change "This" to --The--.

Signed and Sealed this
Twenty-seventh Day of January, 2015

Michelle K. Lee
*Deputy Director of the United States Patent and Trademark Office*